(12) United States Patent
Ohashi

(10) Patent No.: US 9,669,729 B2
(45) Date of Patent: Jun. 6, 2017

(54) MOBILE BODY EQUIPPED WITH FUEL CELL

(71) Applicant: TOYOTA JIDOSHA KABUSHIKI KAISHA, Toyota-shi, Aichi-ken (JP)

(72) Inventor: Yasuhiko Ohashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/025,588

(22) PCT Filed: Sep. 3, 2014

(86) PCT No.: PCT/JP2014/004522
§ 371 (c)(1),
(2) Date: Mar. 29, 2016

(87) PCT Pub. No.: WO2015/052868
PCT Pub. Date: Apr. 16, 2015

(65) Prior Publication Data
US 2016/0207419 A1    Jul. 21, 2016

(30) Foreign Application Priority Data

Oct. 7, 2013  (JP) ................................. 2013-210041

(51) Int. Cl.
*B60K 11/06* (2006.01)
*B60L 11/18* (2006.01)
(Continued)

(52) U.S. Cl.
CPC .......... *B60L 11/1883* (2013.01); *B60K 13/02* (2013.01); *B60L 1/003* (2013.01);
(Continued)

(58) Field of Classification Search
CPC .............. H01M 2250/20; B60K 11/06–11/085
See application file for complete search history.

(56) References Cited

U.S. PATENT DOCUMENTS

| 2010/0170734 A1 | 7/2010 | Teraguchi et al. |
| 2010/0326756 A1* | 12/2010 | Landgraf ............... B60K 13/02 180/68.3 |

(Continued)

FOREIGN PATENT DOCUMENTS

| JP | 2006-298190 | 11/2006 |
| JP | 2007-69629 | 3/2007 |

(Continued)

*Primary Examiner* — Erez Gurari
(74) *Attorney, Agent, or Firm* — Finnegan, Henderson, Farabow, Garrett & Dunner, LLP

(57) ABSTRACT

There is provided a technique of improving an intake structure that takes in the outside air in a fuel cell vehicle. A fuel cell vehicle 10 includes first and second grilles 11 and 12 that are configured to be open forward and take in the outside air. An air intake 100 is placed in a vehicle inner space 10r of the fuel cell vehicle 10. The air intake 100 is placed in a location behind and above the first grille 11 and is configured to take in the air as a reactive gas that is to be supplied to a fuel cell 21. A flow path member 120 is placed in a location in front of and below the air intake 100 and behind the first grille 11. The flow path member 120 has an inclined wall portion 121 that is arranged to face the first grille 11 and is inclined obliquely upward from front to rear.

8 Claims, 12 Drawing Sheets

(51) Int. Cl.
*B60K 13/02* (2006.01)
*H01M 8/04089* (2016.01)
*H01M 8/04082* (2016.01)
*B60L 1/00* (2006.01)
*B60L 3/00* (2006.01)
*B60L 15/20* (2006.01)
*H01M 8/04014* (2016.01)
*B60K 11/08* (2006.01)
*B60K 1/00* (2006.01)
*H01M 8/1018* (2016.01)

(52) U.S. Cl.
CPC ......... *B60L 3/0061* (2013.01); *B60L 11/1892* (2013.01); *B60L 11/1894* (2013.01); *B60L 11/1896* (2013.01); *B60L 11/1898* (2013.01); *B60L 15/20* (2013.01); *H01M 8/04014* (2013.01); *H01M 8/04089* (2013.01); *H01M 8/04201* (2013.01); *B60K 11/08* (2013.01); *B60K 2001/005* (2013.01); *B60L 2240/36* (2013.01); *B60L 2240/421* (2013.01); *B60Y 2200/90* (2013.01); *H01M 2008/1095* (2013.01); *H01M 2250/20* (2013.01); *Y02T 10/645* (2013.01); *Y02T 10/72* (2013.01); *Y02T 10/7275* (2013.01); *Y02T 90/32* (2013.01); *Y02T 90/34* (2013.01)

(56) References Cited

U.S. PATENT DOCUMENTS

2013/0139997 A1* 6/2013 Murakami ......... B60H 1/00278
  165/41
2014/0186732 A1 7/2014 Tachibana et al.

FOREIGN PATENT DOCUMENTS

| JP | 2007-326487 | 12/2007 |
| JP | 2010-158958 | 7/2010 |
| JP | 2013-49350 | 3/2013 |

* cited by examiner

MOBILE BODY EQUIPPED WITH FUEL CELL

CROSS-REFERENCE TO RELATED APPLICATIONS

This application is a national phase application of International Application No. PCT/JP2014/004522, filed Sep. 3, 2014, and claims the priority of Japanese Application No. 2013-210041, filed Oct. 7, 2013, the content of both of which is incorporated herein by reference.

TECHNICAL FIELD

The present invention relates to a fuel cell.

BACKGROUND ART

A fuel cell vehicle equipped with a polymer electrolyte fuel cell, hereinafter simply called "fuel cell", has an air inlet also called grille in a forward portion of the vehicle. Part of the outside air taken in through the grille may be supplied as cathode gas to the fuel cell and may also be used to cool down the fuel cell.

For example, Patent Literature 1 (JP 2013-049350A) discloses the configuration of an air duct provided in an engine room to take in the outside air that is to be supplied to a fuel cell. Patent Literature 2 (JP 2007-069629A) discloses a fuel cell vehicle that is configured such that the volume of the air taken in through a front grille is controlled by an opening-adjustable grille shutter.

SUMMARY

Technical Problem

In the fuel cell vehicle, the cathode gas that is compressed and has increased temperature is generally supplied to the fuel cell. In the fuel cell vehicle, waste heat of the fuel cell, other auxiliary machinery and the like is likely to be transmitted via the cathode gas to the fuel cell and thereby significantly increase the operating temperature of the fuel cell. With regard to the fuel cell vehicle, there is accordingly a need to actively take in a large volume of the outside air through the grille, in order to reduce the effect of waste heat in the vehicle on the cathode gas and decrease the temperature of the cathode gas.

Increasing the volume of the outside air taken in through the grille, on the other hand, causes a problem that extraneous substances such as raindrops and snow are also taken into the vehicle to enter a piping connected with the fuel cell. Especially in the case where a large amount of snow is accumulated in the vicinity of the inlet of the air duct, the snow is likely to be sucked into the air duct and block an air cleaner or the like provided upstream of the fuel cell.

In Patent Literature 1, the configuration of the air duct is improved to suppress water entering the air duct from reaching the air cleaner. Patent Literature 1 has, however, not taken into account the configuration of actively taking in the outside air through the grille or the configuration of suppressing rain or snow entering through the grille from moving into the air duct.

In Patent Literature 2, as described in the paragraph [0027], the grille shutter is fully closed to suppress raindrops from entering through the grille, and the outside air is taken only through an opening that is open downward of the vehicle. The configuration of taking in the outside air only through the opening that is open downward of the vehicle may, however, provide an insufficient intake amount of the outside air. This is likely to cause the air duct not to be sufficiently cooled down by the low-temperature outside air and is likely to cause the air duct main body to be heated with waste heat accumulated inside of the fuel cell vehicle. This may result in increasing the temperature of the cathode gas that is to be supplied to the fuel cell.

As described above, there is still a room for improvement with regard to an intake structure that is configured to take in the outside air in the fuel cell vehicle. With regard to the intake structure of the outside air in the fuel cell vehicle, other needs include downsizing, weight reduction, improvement of the mountability on the vehicle, improvement of the intake efficiency, easy manufacture, cost reduction and resource saving. The improvement of the intake structure of the outside air described above is not limited to the fuel cell vehicle but is the problem commonly found in various moving bodies equipped with the fuel cell.

Solution to Problem

In order to solve at least part of the above problems, the invention may be implemented by any of the following aspects.

(1) According to one aspect of the invention, there is provided a moving body that is equipped with a fuel cell. The moving body may include an air inlet, an inlet duct member and a flow path member. The air inlet may be configured to be open forward of the moving body and take in the air outside of the moving body. The inlet duct member may be placed in a location behind and above the air inlet and may be configured to take in the air as a reactive gas that is to be supplied to the fuel cell. The flow path member may serve to guide the air. The flow path member may be placed in a location behind the air inlet and in front of and below the inlet duct member. The flow path member may have an inclined wall portion that is arranged to face the air inlet and is inclined obliquely upward from front to rear. In the moving body of this aspect, the air taken through the air inlet into the moving body is guided by the flow path member to the inlet duct member located above the flow path member. Raindrops and snow entering along with the outside air are separated upward of the inlet duct member by the inertial force applied in a direction along the wall surface of the inclined wall portion of the flow path member. This configuration accordingly ensures the volume of the air taken into the moving body, while suppressing raindrops and snow from entering the inlet duct member.

(2) In the moving body of the above aspect, the flow path member may have first and second side wall portions that are provided on both sides of the inclined wall portion in a width direction of the moving body and are extended from the inclined wall portion toward the air inlet. A distance in the width direction of the moving body between end sides of the first and the second side wall portions facing the air inlet may be smaller than an opening width of the air inlet in the width direction of the moving body. In the moving body of this aspect, the first and the second side wall portions of the flow path member suppress raindrops and snow entering through the respective ends of the air inlet in the width direction of the moving body from being guided toward the inlet duct member. The hot air, which is heated with waste heat and is accumulated inside of the vehicle, is also suppressed from being guided toward the inlet duct member by the first and the second side wall portions of the flow path member.

(3) In the moving body of the above aspect, a cavity may be formed between the air inlet and the inclined wall portion of the flow path member to be open downward of the moving body. In the moving body of this aspect, the cavity provided ahead of the flow path member may serve as a recess to release raindrops and snow entering through the air inlet, downward of the moving body or to release water entering through the air inlet in the case where the moving body is exposed to water or is flooded, downward of the moving body. The cavity may also serve as a crushable zone, which is also called as a crumple zone, and reduce damage of the moving body, for example, in the event of a minor collision of the moving body.

(4) The moving body of the above aspect may further comprise, in addition to the above air inlet specified as a first air inlet, a second air inlet that is placed in a location below the first air inlet and is configured to be open in a location below the flow path member and take in the air from outside of the moving body. The moving body may also comprise a heat exchanger that is placed behind the second air inlet and is configured to exchange heat with the air. In the moving body of this aspect, the flow path member suppresses raindrops and snow entering through the second air inlet from moving toward the inlet duct member.

(5) The moving body of the above aspect may further comprise an opening wall member. The opening wall member may have a wall surface that is arranged to face an inclined surface of the inclined wall portion at a position above the inclined wall portion of the flow path member and in front of the inlet duct member and is extended in the width direction of the moving body, and at least one through hole that is formed in the wall surface to be open toward the inclined surface of the inclined wall portion. In the moving body of this aspect, the opening wall member restricts raindrops and snow from entering the inlet duct member. Even when a large volume of water passes through the through hole of the opening wall member, for example, in the case where the moving body is exposed to water or is flooded, this configuration causes the water to be spread around the through hole on the surface of the opening wall member. This accordingly reduces the volume of water entering the inlet duct member.

(6) In the moving body of the above aspect, the inlet duct member may have an opening end portion that is extended forward of the moving body and is configured to be open forward of the moving body. The moving body of this aspect makes the air guided by the flow path member more likely to enter the inlet duct member, while suppressing the air heated with waste heat and accumulated behind the inlet duct member or the like from moving toward the opening of the inlet duct member.

(7) The moving body of the above aspect may further comprise an upper cover member and a seal member. The upper cover member may be arranged to cover at least an area from the air inlet to a rear end of the inlet duct member and may form an upper surface of the moving body. The seal member may be extended in a direction intersecting with an extending direction of the opening end portion above the opening end portion of the inlet duct member and may be pressed against the upper cover member to form a seal line that seals a region behind the opening end portion. The seal member may be arranged to be locally placed backward of the moving body in a location above the opening end portion. In the moving body of this aspect, the seal member suppresses the air heated with waste heat and accumulated inside of the moving body from moving from the region behind the opening end portion of the inlet duct member toward the opening end portion of the inlet duct member. The seal member is placed backward in the location above the opening end portion of the inlet duct member. This configuration ensures the region for trapping the snow above the opening end portion. This suppresses the snow accumulated in the vicinity of the opening end portion from entering the opening end portion. The seal member may not be directly placed on the opening end portion of the inlet duct member but may be placed on a cover member that is located above the opening end portion of the inlet duct member.

The invention may be implemented by various aspects other than the moving body equipped with the fuel cell. For example, the invention may be implemented by aspects of an intake structure and an intake method employed in the moving body equipped with the fuel cell as well as by aspects of components used to configure the intake structure and the intake method. The intake structure of the invention may be applied to any moving body that is configured to take in the outside air, other than the moving body equipped with the fuel cell.

DESCRIPTION OF EMBODIMENTS

A. First Embodiment

A1. Configuration of Fuel Cell Vehicle

Figure 1:
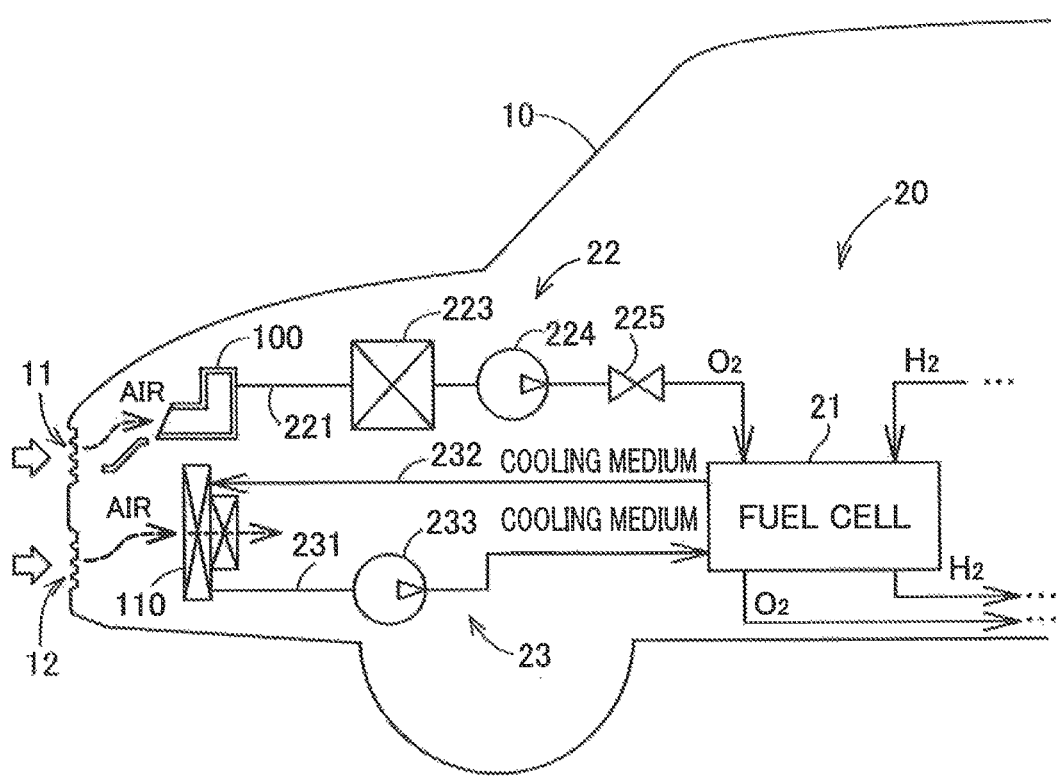
FIG. 1 is a schematic diagram illustrating the configuration of a fuel cell vehicle.

FIG. 1 is a schematic diagram illustrating the configuration of a fuel cell vehicle 10 according to a first embodiment of the invention. FIG. 1 illustrates the outline representing the configuration of a forward portion of the fuel cell vehicle 10 and also illustrates the schematic configuration of a fuel cell system 20 mounted on the fuel cell vehicle 10. This fuel cell vehicle 10 is a moving body equipped with a fuel cell 21 and is configured to drive a motor which is not shown in the figures as a driving power source using electric power output from the fuel cell 21.

The fuel cell 21 is a polymer electrolyte fuel cell that receives supplies of hydrogen and oxygen as reactive gases and generates electric power. The fuel cell 21 is incorporated in the fuel cell system 20 described below. The fuel cell system 20 includes a cathode gas supply system 22 and a cooling medium circulation/supply system 23. The fuel cell system 20 also includes an anode gas supply system that is configured to supply hydrogen as anode gas and an exhaust piping system that is configured to control and treat exhaust gas and drainage water discharged from the fuel cell 21. The configurations of these components are, however, known and are omitted from the illustration and the description.

The cathode gas supply system 22 takes in the outside air and supplies the intake air as cathode gas to the fuel cell 21. The cathode gas supply system 22 includes a supply pipe 221 that is connected with an inlet on the cathode side of the fuel cell 21. The supply pipe 221 is equipped with an air intake 100, an air cleaner 223, an air compressor 224 and an on-off valve 225 that are arranged sequentially from the upstream. The air intake 100 serves as the inlet duct member to introduce the air into the supply pipe 221. The details of the air intake 100 will be described later.

The air cleaner 223 removes extraneous substances such as dirt and dust included in the air flowing in from the air intake 100. The air compressor 224 sucks the outside air, compresses the sucked air to a predetermined pressure and feeds the compressed air to the downstream. The on-off valve 225 controls the cathode gas flowing into and out of the cathode of the fuel cell 21. The on-off valve 225 is normally closed and is opened when the cathode gas of the predetermined pressure flows in from the upstream.

The cooling medium circulation/supply system 23 circulates a temperature-regulated cooling medium through the fuel cell 21 so as to control the operating temperature of the fuel cell 21. The cooling medium circulation/supply system 23 includes a radiator unit 110, a cooling medium supply pipe 231, a cooling medium discharge pipe 232 and a circulation pump 233. The radiator unit 110 is a heat exchanger configured to exchange heat between the cooling medium and the air taken in from the outside of the fuel cell vehicle 10.

The cooling medium supply pipe 231 is a pipe arranged to connect the outlet of the radiator unit 110 with the inlet of a cooling medium flow path provided inside of the fuel cell 21. The cooling medium discharge pipe 232 is a pipe arranged to connect the outlet of the cooling medium flow path provided inside of the fuel cell 21 with the inlet of the radiator unit 110. The circulation pump 233 is placed in the middle of the cooling medium supply pipe 231 to generate driving force for circulating the cooling medium between the radiator unit 110 and the fuel cell 21. The fuel cell system 20 controls the rotation speed of the circulation pump 233 so as to control the flow rate of the cooling medium flowing into the fuel cell 21 and thereby control the operating temperature of the fuel cell 21.

As described above, the fuel cell vehicle 10 uses the air taken in from the outside as the cathode gas of the fuel cell 21 and also as the heat medium for cooling down the cooling medium of the fuel cell 21. The fuel cell vehicle 10 is accordingly provided with a first grille 11 and a second grille 12 in the forward portion of the vehicle to serve as the air inlets for taking in the outside air into the vehicle. An intake structure is formed in a vehicle inner space in the forward portion of the vehicle that communicates with the outside of the vehicle via the first and the second grilles 11 and 12, and is configured to guide the air taken in from the outside of the vehicle, into the air intake 100 and the radiator unit 110 as described below.

A2. Configuration of Vehicle Inner Space

Figure 2:
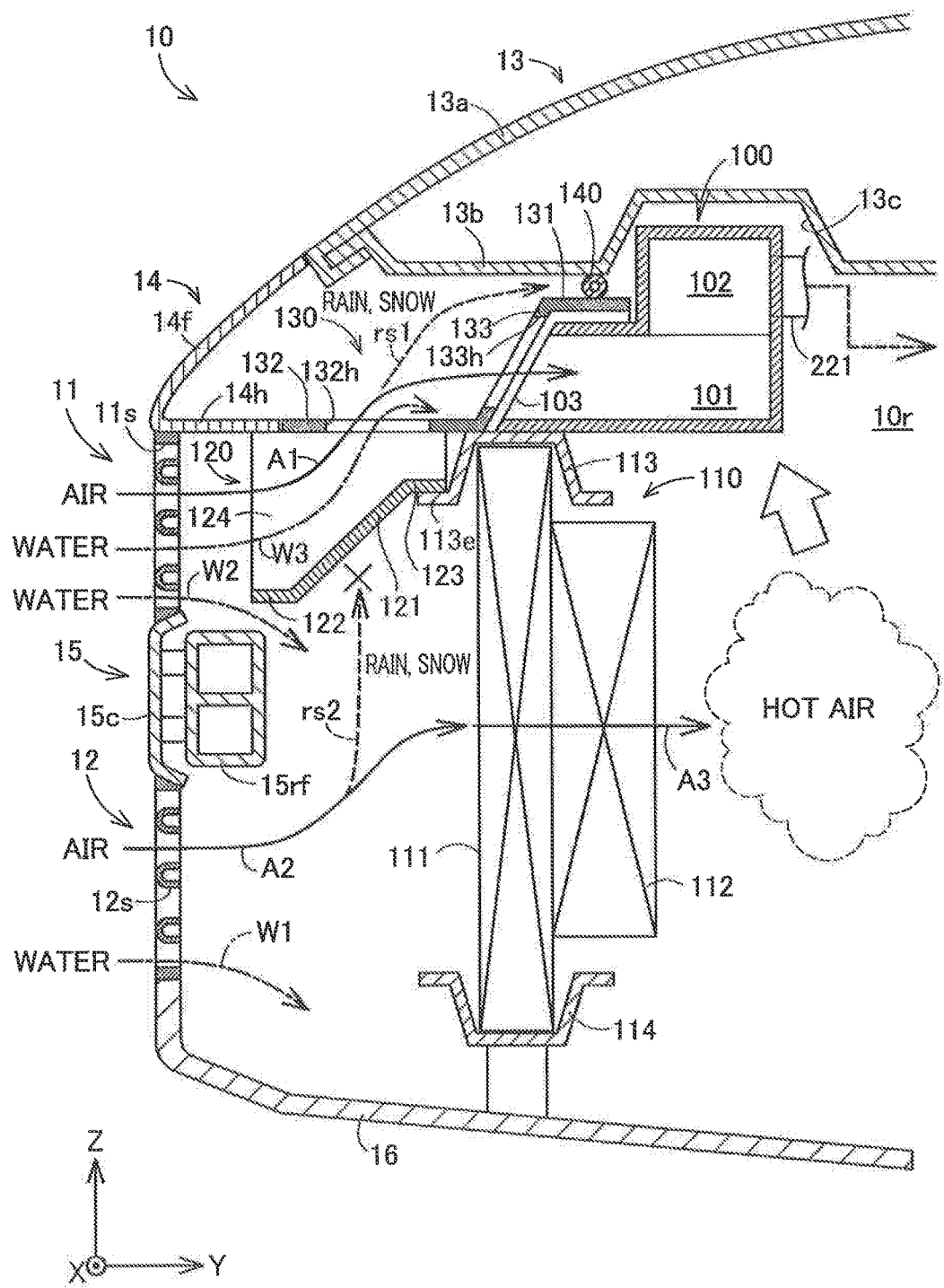
FIG. 2 is a schematic sectional view illustrating the internal configuration of a vehicle inner space provided in a forward portion of the fuel cell vehicle, taken along a vehicle width direction.
Figure 3:
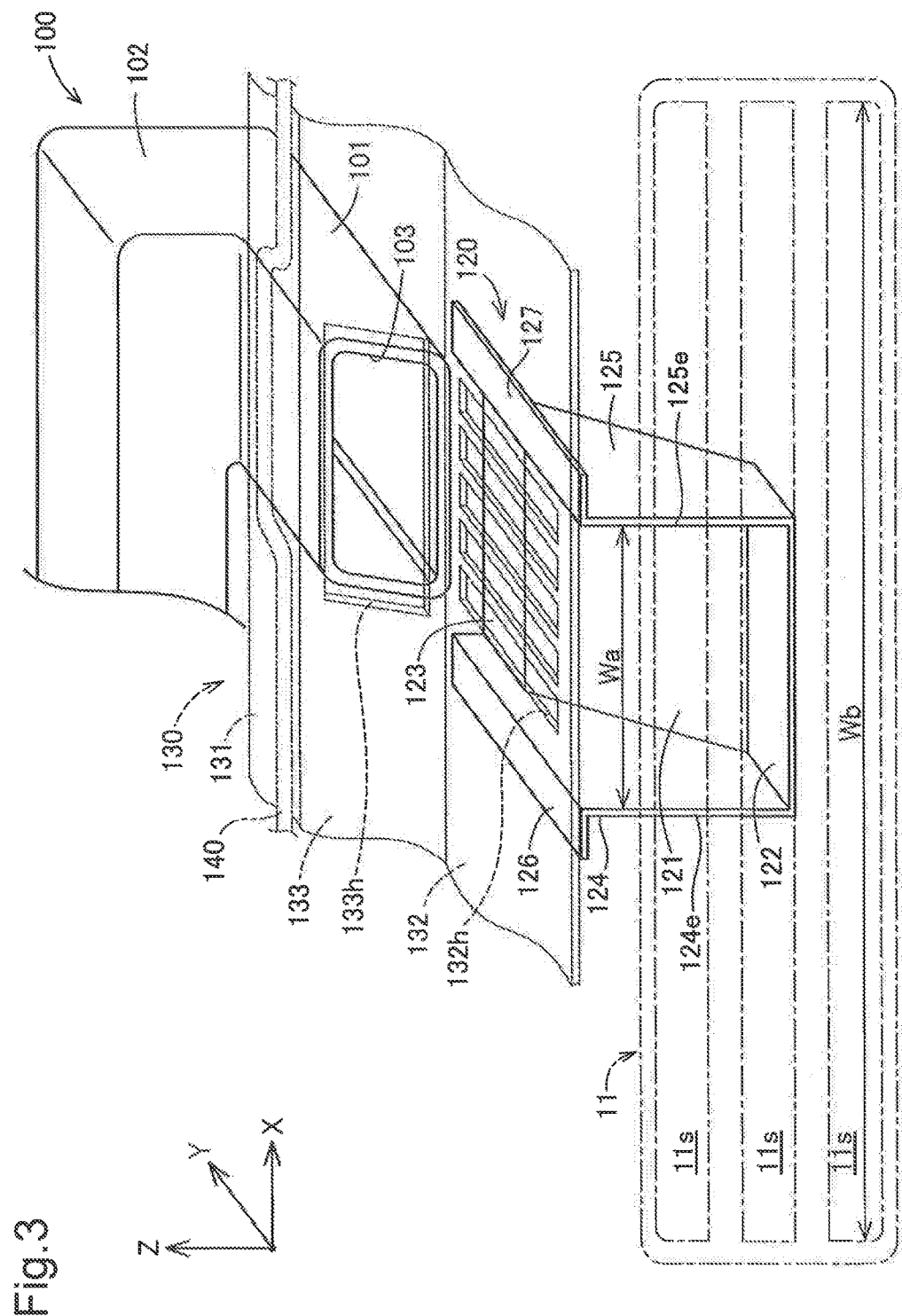
FIG. 3 is a schematic perspective view illustrating the configuration of a first grille, an air intake, a flow path member, an inner cover member and a seal member and their positional relationship.

FIG. 2 is a schematic sectional view illustrating the internal configuration of a vehicle inner space 10r provided in the forward portion of the fuel cell vehicle 10, taken along a vehicle width direction. As the details will be described later, the illustration of FIG. 2 includes arrows indicating the flows of the air and water entering the vehicle inner space 10r. FIG. 3 is a schematic perspective view illustrating the configuration of the first grille 11, the air intake 100, a flow path member 120, an inner cover member 130 and a seal member 140 placed in an upper portion of the vehicle inner space 10r and their positional relationship. In FIG. 3, for convenience of illustration, the first grille 11 is shown by the one-dot chain line; the inner cover member 130 is shown by the broken line; and the seal member 140 is shown by the two-dot chain line.

Three arrows X, Y and Z that are orthogonal to one another are illustrated in each of FIGS. 2 and 3. The arrow X indicates the width direction of the fuel cell vehicle 10, hereinafter called "vehicle width direction", and is directed from the left to the right when viewed from the front of the fuel cell vehicle 10. The arrow Y indicates the longitudinal direction of the fuel cell vehicle 10, hereinafter called "vehicle longitudinal direction", and is directed from the front to the rear of the fuel cell vehicle 10. The arrow Z indicates the vertical direction of the fuel cell vehicle 10, hereinafter called "vehicle vertical direction", and is directed from the bottom to the top of the fuel cell vehicle 10. The arrows X and Y are parallel to the horizontal plane, and the arrow Z is parallel to the direction of gravity. In the respective drawings referred to for the description herein, similar arrows X, Y and Z to those described above are illustrated as appropriate.

The upper portion of the vehicle inner space 10r is covered with an upper cover member 13 as shown in FIG. 2. The upper cover member 13 corresponds to a member called hood or bonnet and is mounted to be openable and closable by a hinge or the like, which are omitted from the illustration. The upper cover member 13 has the dual structure of an outer wall portion 13a and an inner wall portion 13b. The inner wall portion 13b of the upper cover member 13 has a recess 13c that is provided to receive an upper flow path portion 102 of the air intake 100. The inner wall portion 13b is configured to press the seal member 140 and form a seal line as described later. A front cover member 14 is provided ahead of the upper cover member 13.

The front cover member 14 includes an inclined wall portion 14f and a horizontal wall portion 14h. The inclined wall portion 14f is a part inclined obliquely upward from the front toward the rear on the outer surface of the fuel cell vehicle 10. The horizontal wall portion 14h is a part protruded approximately horizontally into the vehicle inner space 10r. The inclined wall portion 14f and the outer wall portion 13a of the upper cover member 13 are configured such that their surfaces form a gentle continuous curved surface. The horizontal wall portion 14h is configured such that the horizontal wall portion 14h and a second horizontal wall portion 132 of the inner cover member 130 described later form a continuous flat plate.

The first grille 11 and the second grille 12 described above are provided below the front cover member 14. The first grille 11 and the second grille 12 are aligned in the vehicle vertical direction, such that the first grille 11 is located on the upper side and the second grille 12 is located on the lower side. The first grille 11 and the second grille 12 respectively have a plurality of openings 11s and a plurality of openings 12s configured to make the outside of the fuel cell vehicle 10 communicate with the vehicle inner space 10r and flow the air into the vehicle inner space 10r. The respective openings 11s or 12s are provided as a plurality of parallel through grooves extended in the vehicle width direction. A bumper structure 15 is provided between the first grille 11 and the second grippe 12.

The bumper structure 15 is a shock absorber to absorb an impact in the event of a collision of the fuel cell vehicle 10. The bumper structure 15 includes an outer cover portion 15c arranged to be exposed outside and a reinforcing beam portion 15rf arranged horizontally over the entire vehicle width direction in the vehicle inner space 10r. A lower cover member 16 is placed below the second grille 12. The lower cover member 16 is extended rearward from a lower end of the second grille 12 to cover the entire bottom of the vehicle inner space 10r.

The air intake 100, which is shown in FIGS. 2 and 3, is placed in a location behind and above the first grippe 11 and above the radiator unit 110. The air intake 100 includes a lower flow path portion 101 and an upper flow path portion 102. The lower flow path portion 101 is extended in the vehicle longitudinal direction and has an opening 103 that is open forward. The upper flow path portion 102 is connected with a downstream end of the lower flow path portion 101 and is extended in the vehicle width direction above the lower flow path portion 101. The upper flow path portion 102 is connected with the supply pipe 221 of the cathode gas supply system 22 that is shown in FIG. 1.

The radiator unit 110, which is shown in FIG. 2, is placed below the lower flow path portion 101 of the air intake 100. The radiator unit 110 includes a radiator main body 111 and a fan part 112. The radiator main body 111 includes a tube and a fin for heat exchange and is formed in an approximately flat plate-like shape. The radiator main body 111 is placed along the vehicle vertical direction to face both the first grille 11 and the second grille 12.

The radiator main body 111 has an upper end and a lower end that are respectively held by holding members 113 and 114. The holding members 113 and 114 are beam-like members extended in the vehicle width direction and respectively have grooves which the upper end and the lower end of the radiator main body 111 are inserted in. The fan part 112 is placed behind the radiator main body 111 to be adjacent to the rear face of the radiator main body 111 and is configured to guide the air in front of the radiator main body 111 rearward. The flow path member 120 is placed between the radiator main body 111 and the first grille 11.

The flow path member 120 is placed ahead of the opening 103 of the air intake 100 as shown in FIGS. 2 and 3. As the details will be described later, the flow path member 120 serves to guide the air taken in through the first grille 11, into the air intake 100 and also serves to suppress raindrops and snow entering the vehicle inner space 10r from further entering the air intake 100. The flow path member 120 includes an inclined wall portion 121, first and second horizontal wall portions 122 and 123, first and second side wall portions 124 and 125, and first and second fixing wall portions 126 and 127.

The inclined wall portion 121 is a flat plate part arranged to form a wall surface that faces the openings 11s of the first grille 11 and is inclined obliquely upward from the front toward the rear. The first and the second horizontal wall portions 122 and 123 are flat plate parts respectively extended horizontally from a forward end and a rearward end of the inclined wall portion 121. The first horizontal wall portion 122 is located at a lower position than the second horizontal wall portion 123. The second horizontal wall portion 123 is placed on a fringe portion 113e that is formed on a forward end of the holding member 113 provided to hold the upper end of the radiator main body 111.

The first and the second side wall portions 124 and 125 are flat plate parts that form the side walls of the flow path member 120. The first and the second side wall portions 124 and 125 are formed to be folded from the respective end sides in the vehicle width direction of the inclined wall portion 121 and the first and the second horizontal wall portions 122 and 123 and to be extended toward the first grille 11.

The flow path member 120 is configured such that a distance Wa in the vehicle width direction between forward ends 124e and 125e of the first and the second side wall portions 124 and 125 facing the first grille 11 is narrower than an opening width Wb in the vehicle width direction of the openings 11s of the first grille 11. The reason of this configuration will be described later. The first and the second side wall portions 124 and 125 may not be necessarily formed parallel to each other but may have the distance therebetween increasing toward the first grille 11.

The first and the second fixing wall portions 126 and 127 are flat plate parts folded from the upper end sides of the first and the second side wall portions 124 and 125 and extended in the vehicle width direction and are configured to fix the flow path member 120 to the inner cover member 130 located above the flow path member 120. The first and the second fixing wall portions 126 and 127 are formed such that their upper surfaces are located at substantially the same height positions and are joined with the lower face of the inner cover member 130 located above the flow path member 120.

The flow path member 120 is arranged such that the center position in the vehicle width direction of the inclined wall portion 121 is aligned with the center position in the vehicle width direction of the opening 103 of the air intake 100 as shown in FIG. 3. The flow path member 120 is also arranged such that cavities are formed in front of and below the flow path member 120 as shown in FIG. 2. More specifically, the flow path member 120 is configured such that a cavity is formed between a forward end of the first horizontal wall portion 122 and the first grille 11 and a cavity is formed between the forward end of the first horizontal wall portion 122 and the reinforcing beam portion 15rf of the bumper structure 15. The reason of this configuration will be described later. The inner cover member 130 is placed above the flow path member 120.

The inner cover member 130 that is shown in FIGS. 2 and 3 is a plate member laid over the vehicle width direction in the vehicle inner space 10r and serves like a radiator support cover. The inner cover member 130 includes first and second horizontal wall portions 131 and 132 and an inclined wall portion 133. The first horizontal wall portion 131 is a part horizontally extended above the lower flow path portion 101 of the air intake 100. The second horizontal wall portion 132 is a part horizontally extended below the first horizontal wall portion 131 and above the flow path member 120.

Through holes 132h formed as a plurality of parallel long through holes extended along the vehicle longitudinal direction are provided in a region of the second horizontal wall portion 132 above the flow path member 120 to make the air guided from the flow path member 120 flow through. The second horizontal wall portion 132 is arranged such that the second horizontal wall portion 132 and the horizontal wall portion 14h of the front cover member 14 form a continuous flat plate in the vehicle longitudinal direction as described above.

The inclined wall portion 133 is a part inclined obliquely upward from the front toward the rear between the first and the second horizontal wall portions 131 and 132 and is placed ahead of the lower flow path portion 101 of the air intake 100. A through hole 133h is formed in a region of the inclined wall portion 133 that is located in front of the opening 103 of the air intake 100 to flow the air into the opening 103 of the air intake 100. The seal member 140 in a line shape is placed above the first horizontal wall portion 131 of the inner cover member 130.

The seal member 140 is extended over the vehicle width direction to cross above the lower flow path portion 101 of the air intake 100 as shown in FIG. 3. The seal member 140 is pressed by the inner wall portion 13b of the upper cover member 13 and the horizontal wall portion 131 of the inner cover member 130 to form a seal line and air-tightly seal a region behind the radiator 110 in the vehicle inner space 10r. The seal member 140 is configured such that the seal line is locally placed backward in a region above the lower flow path portion 101 of the air intake 100. The reason of this configuration will be described later.

The illustration of FIG. 2 includes various arrows indicating the flows of the air and the like in the vehicle inner space 10r. The following describes the flows of the air that is taken into the vehicle inner space 10r through the first and the second grilles 11 and 12 and the flows of water that enters the vehicle inner space 10r through the first and the second grilles 11 and 12 in the form of raindrops or snow or enters the vehicle inner space 10r in the event of flooding or water exposure.

A3. Flows of the Air and the Like in Vehicle Inner Space

As shown by a solid line arrow A1, the air that enters the vehicle inner space 10r through the openings 11s of the first grille 11 and reaches the flow path member 120 flows along the wall surface of the inclined wall portion 121 of the flow path member 120. This air flow then passes through the through holes 132h formed in the second horizontal wall portion 132 and the through hole 133h formed in the inclined wall portion 133 of the inner cover member 130 and reaches the opening 103 of the lower flow path portion 101 of the air intake 100. The configuration of the flow path member 120 ensures the volume of the air that is taken in from the outside and flows into the air intake 100.

The second horizontal wall portion 132 of the inner cover member 130 located above the flow path member 120 is configured to interfere with the upward flow of part of raindrops and snow entering, along with the air, the vehicle inner space 10r through the first grille 11. The horizontal wall portion 14h of the front cover member 14 located adjacent to the inner cover member 130 is also configured to interfere with the upward flow of such raindrops and snow.

As shown by a broken line arrow rs1, raindrops and snow passing through the through holes 132h of the inner cover member 130 are guided upward above the opening 103 of the air intake 100 by the inertial force applied in a direction along an upper wall surface of the inclined wall portion 121 of the flow path member 120. In the fuel cell vehicle 10, the flow path member 120 and the inner cover member 130 are configured to suppress raindrops and snow from entering the opening 103 of the air intake 100.

As shown by a solid line arrow A2, the air that enters the vehicle inner space 10r through the openings 12s of the second grille 12 is, on the other hand, sucked by the fan part 112 of the radiator unit 110 to be guided to the radiator main body 111. Even in the case where raindrops and snow enter the vehicle inner space 10r through the openings 12s of the second grille 12, as shown by a broken line arrow rs2, the flow path member 120 located above the second grille 12 serves to suppress raindrops and snow from being guided to the air intake 100.

A4. Functions of Side Wall Portions of Flow Path Member

Figure 4:
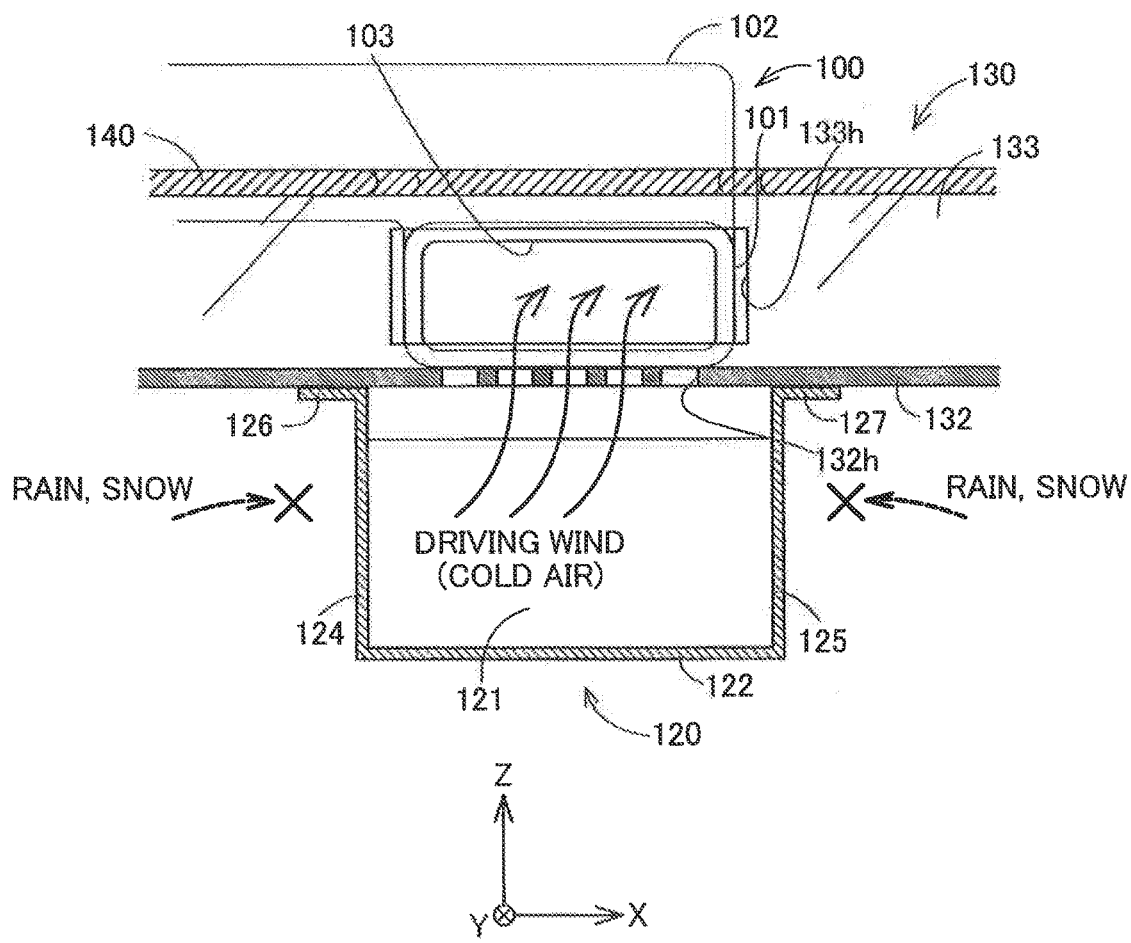
FIG. 4 is a schematic diagram illustrating the functions of first and second side wall portions of the flow path member.

FIG. 4 is a schematic diagram illustrating the functions of the first and the second side wall portions 124 and 125 of the flow path member 120. FIG. 4 schematically illustrates the air intake 100, the flow path member 120, the inner cover member 130 and the seal member 140 viewed along the vehicle longitudinal direction. The illustration of FIG. 4 also includes solid line arrows indicating the flows of the air guided into the air intake 100 and broken line arrows indicating suppression of raindrops and snow from flowing toward the opening 103 of the air intake 100.

The first and the second side wall portions 124 and 125 serve as guide walls to effectively guide the driving wind (cold air) that flows through the first grille 11 into between the first and the second side wall portions 124 and 125, to the opening 103 of the air intake 100. The first and the second side wall portions 124 and 125 also serve as barriers to suppress raindrops and snow from flowing into the air intake. As described above, the first and the second side wall portions 124 and 125 of the flow path member 120 are arranged to define a flow path of the narrower width than the opening width in the vehicle width direction of the openings 11s of the first grille 11 as shown in FIG. 3. As shown by the broken line arrows in FIG. 4, the first and the second side wall portions 124 and 125 thus serve to suppress raindrops and snow that enter through the first grille 11 and especially enter from the outside region of the flow path member 120, from being guided in the direction toward the opening 103 of the air intake 100.

A5. Effect of Suppressing Temperature Rise of Cathode Gas

Figure 5:
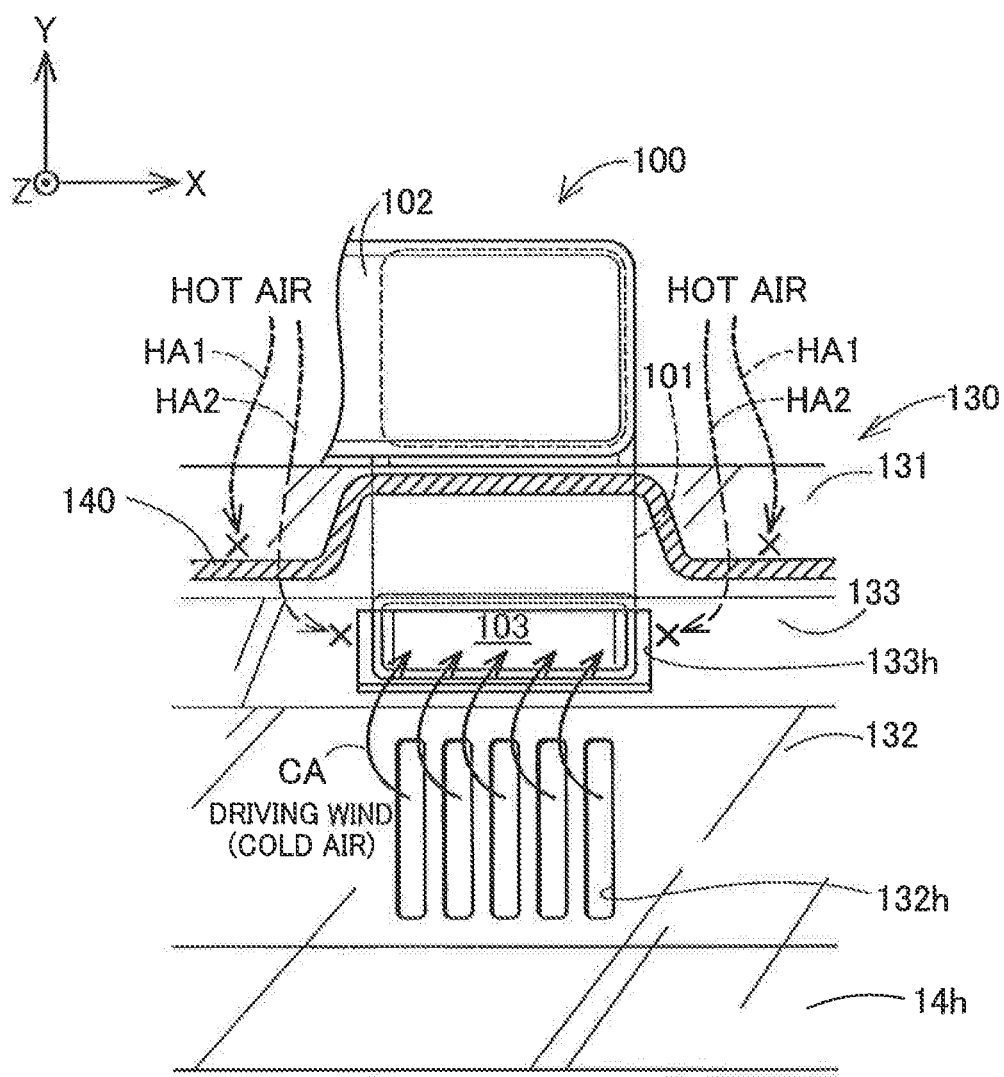
FIG. 5 is a schematic diagram illustrating the effect of suppressing a temperature rise of cathode gas in the fuel cell vehicle.

FIG. 5 is a schematic diagram illustrating the effect of suppressing a temperature rise of the cathode gas in the fuel cell vehicle 10. FIG. 5 schematically illustrates the air intake 100 and the inner cover member 130 viewed downward along the vehicle vertical direction. The illustration of FIG. 5 also includes solid line arrows CA indicating the cold air flowing into the opening 103 of the air intake 100 and broken line arrows HA1 and HA2 indicating suppression of the hot air from flowing into the opening 103 of the air intake 100.

As shown by a solid line arrow A3 in FIG. 2, the hot air heated by heat exchange in the radiator main body 111 flows into a region behind the radiator main body 110. The hot air heated by heat exchange with the cooling medium in the radiator unit 110 is accordingly present below the air intake 100. As shown by an open arrow in FIG. 2, the hot air is likely to be pressurized by actuation of the fan part 112 of the radiator unit 110 and move upward to the air intake 100. In the fuel cell vehicle 10, the hot air heated with waste heat of other auxiliary machinery may be present in the vicinity of the air intake 100.

In the fuel cell vehicle 10 of this embodiment, as shown by the broken line arrows HA1 in FIG. 5, the seal member 140 placed above the air intake 100 suppresses the hot air from moving toward the region ahead of the opening 103 of the air intake 100. As shown by the broken line arrows HA2, the hot air is also likely to move toward the opening 103 from behind the air intake 100 below the inner cover member 130. As shown by the solid line arrows CA, the powerful driving wind that is actively guided via the flow path member 120 into the opening 103 of the air intake 100 suppresses the hot air from flowing into the opening 103 of the air intake 100.

Additionally, in the fuel cell vehicle 10 of the embodiment, as shown by the solid line arrows CA, the cold air actively guided via the flow path member 120 into the air intake 100 cools down the main body of the air intake 100. This suppresses the main body of the air intake 100 from being heated by the hot air described above or the waste heat in the fuel cell vehicle 10. As described above, the configuration of the fuel cell vehicle 10 of the embodiment suppresses the high-temperature air from being supplied as the cathode gas to the fuel cell 21 shown in FIG. 1 and thereby suppresses a significant increase in operating temperature of the fuel cell 21.

A6. Water Entering During Water Exposure or Flooding

In the case where the fuel cell vehicle 10 is flooded or exposed to water, as shown by one-dot chain line arrows W1 to W3 in FIG. 2, water may flow in through the first and the second grilles 11 and 12 into the vehicle inner space 10r. More specifically, the air compressor 224 is provided downstream of the air intake 100 as shown in FIG. 1, so that a large volume of water is likely to flow in through the first grille 11 by the effect of the suction force.

In this case, the water flowing in through the second grille 12 flows down in the vehicle inner space 10r and is highly unlikely to reach the air intake 100 as shown by the arrow W1. A major part of the water flowing in through the first grille 11, on the other hand, flows downward below the flow path member 120 through the sides of the flow path member 120 or through the cavities formed in front of and below the flow path member 120 as shown by the arrow W2.

The cavities formed in front of and below the flow path member 120 serve as recesses to release the water entering the vehicle inner space 10r through the first grille 11, to the downward region. These cavities also serve as a crushable zone, which is a crumple zone, to absorb an impact in the event of a collision of the fuel cell vehicle 10. This configuration suppresses the fuel cell vehicle 10 from being damaged in the case of a minor collision or the like.

The water flowing in through the first grille 11 may flow upward via the flow path member 120. The second horizontal wall portion 132 of the inner cover member 130 suppresses a major part of the water from flowing into the air intake 100. The remaining water reaches an upper surface of the inner cover member 130 through the through holes 132h of the second horizontal wall portion 132. This water is, however, unlikely to reach the opening 103 of the air intake 100 as described below.

Figure 6:
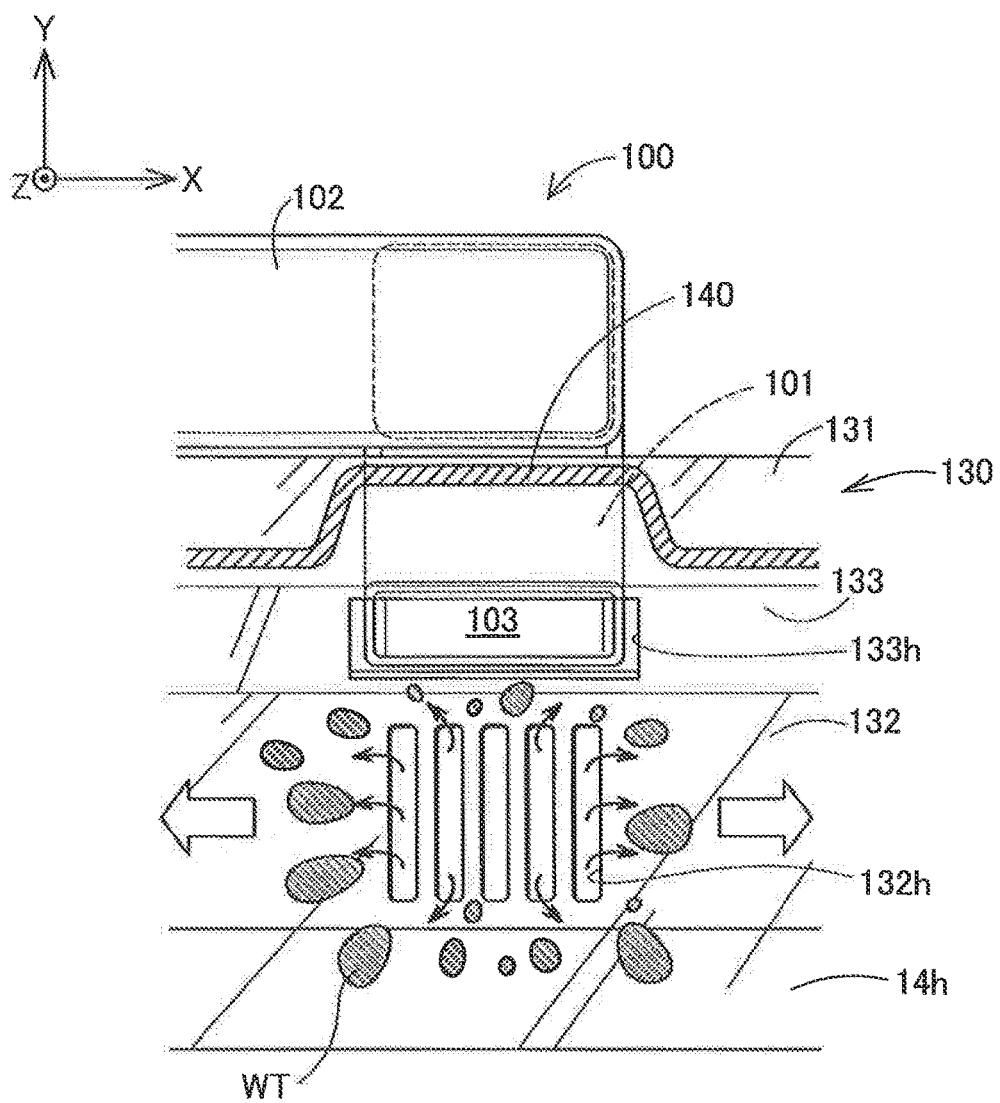
FIG. 6 is a diagram illustrating the behavior of water that flows to an upper surface of the inner cover member.

FIG. 6 is a diagram illustrating the behavior of water that flows to the upper surface of the inner cover member 130. FIG. 6 schematically illustrates the through holes 132h of the inner cover member 130 viewed downward along the vehicle vertical direction and also schematically illustrates the state that the water flowing in through the through holes 132h is splashed.

The water flowing in through the through holes 132h of the inner cover member 130 to above the second horizontal wall portion 132 flows through the narrow passage of the small opening diameter and then flows out to the wide space of the large capacity. The water is accordingly splashed around the through holes 132h when flowing out of the through holes 132h. The second horizontal wall portion 132 of the inner cover member 130 is extended in the vehicle width direction, so that a major part of water droplets ST splashed around the through holes 132h is likely to flow in the vehicle width direction along the second horizontal wall portion 132 as shown by open arrows. The through holes 132h of the inner cover member 130 accordingly serve to further reduce the volume of water reaching the opening 103 of the air intake 100.

As described above, even in the case where a large volume of water enters the fuel cell vehicle 10 through the first and the second grilles 11 and 12, the configuration of the flow path member 120 and the inner cover member 130 suppresses the water from reaching the opening 103 of the air intake 100.

A7. Functions of Seal Member

Figure 7:
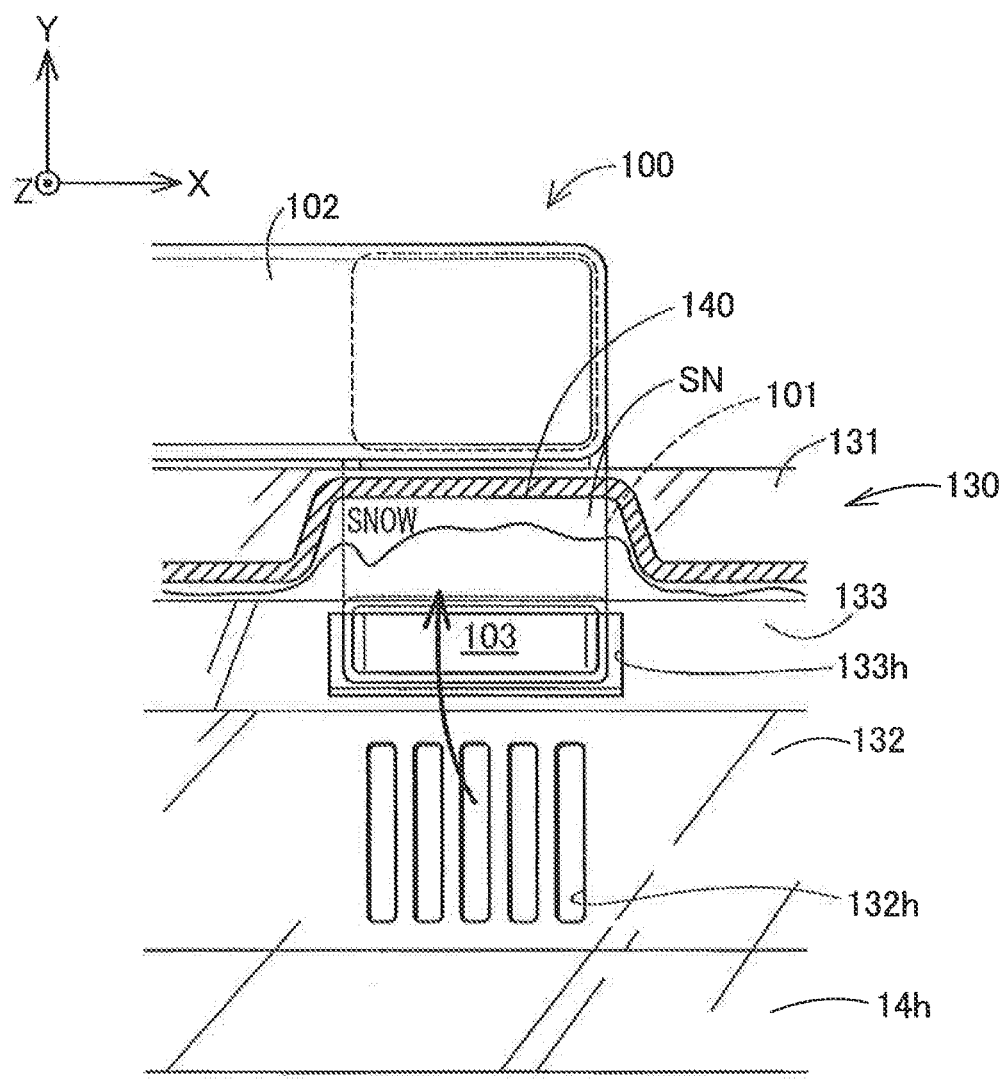
FIG. 7 is a diagram illustrating the snow trapping function of the seal member.

FIG. 7 is a diagram illustrating the snow trapping function of the seal member 140. FIG. 7 is substantially similar to FIG. 6, except that accumulated snow SN is illustrated in place of the water droplets WT. As described above, the snow guided by the flow path member 120 flows upward above the opening 103 of the air intake 100 (as shown by the broken line arrow rs1 in FIG. 2). Accordingly snow SN is accumulated on the upper surface of the first horizontal wall portion 131 of the inner cover member 130 placed above the opening 103 of the air intake 100.

The seal member 140 is placed backward in the region above the opening 103 of the air intake 100 from the remaining regions. This allows snow SN to enter to the deeper position above the opening 103 of the air intake 100. A major part of the snow SN is accordingly trapped in a location distant from the opening 103 above the opening 103 of the air intake 100. This configuration thus suppresses part of the accumulated snow SN from being sucked into the opening 103 of the air intake 100.

A8. First Reference Example

Figure 8:
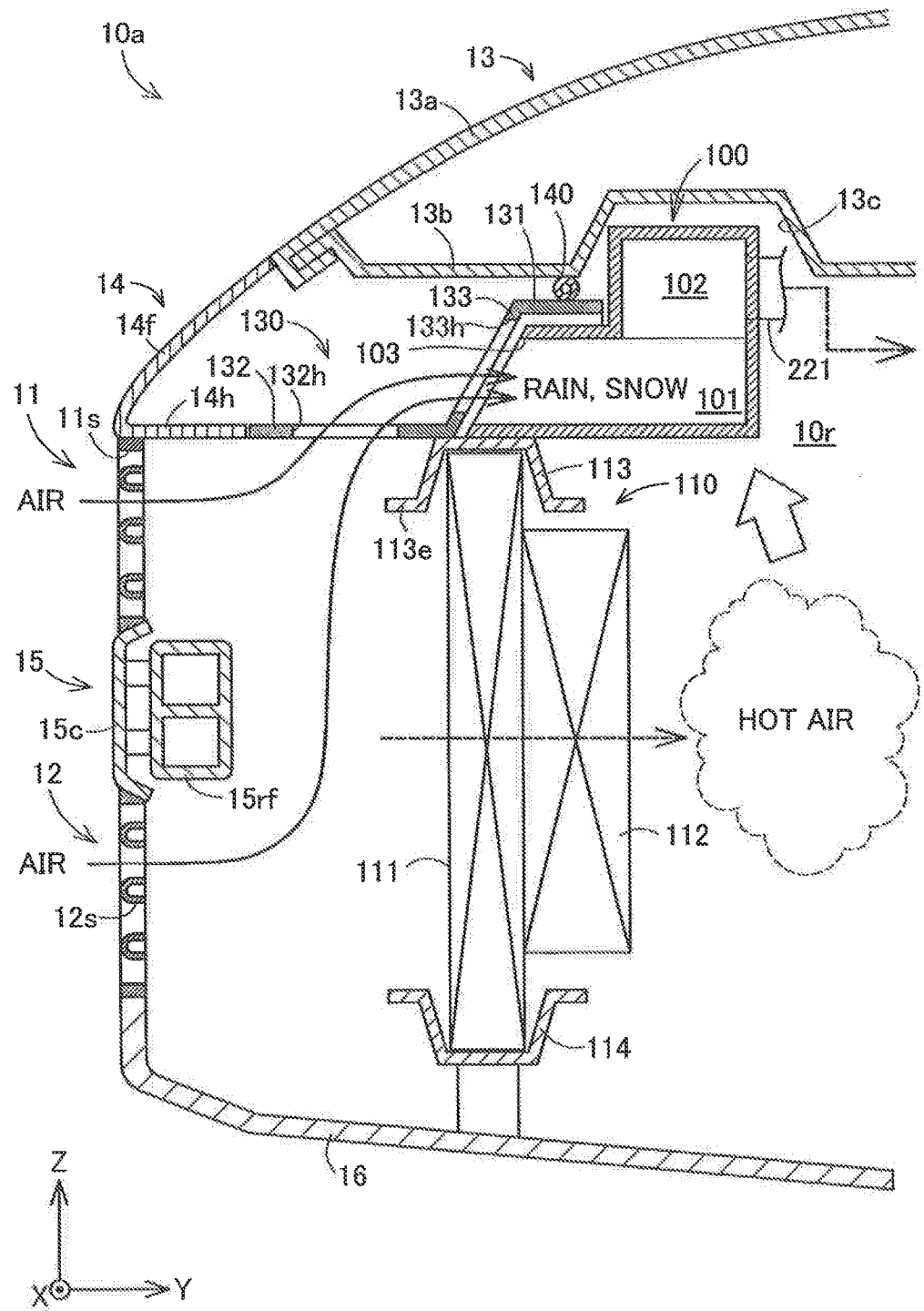
FIG. 8 is a schematic diagram illustrating the flows of the air in a vehicle inner space in a configuration with omission of the flow path member as a first reference example.

FIG. 8 is a schematic diagram illustrating the flows of the air in a vehicle inner space 10r in a configuration with omission of the flow path member 120 as a first reference example. FIG. 8 illustrates the schematic section of a vehicle inner space 10r in a fuel cell vehicle 10a of the first reference example, like FIG. 2. The fuel cell vehicle 10a of the first reference example has similar configuration to the configuration of the fuel cell vehicle 10 of the above embodiment, except omission of the flow path member 120.

The air is sucked into the air intake 100 by the air compressor 224 provided on the downstream side as shown in FIG. 1. The pressure loss in the radiator unit 110 is larger than the pressure loss in the air intake 100. The fuel cell vehicle 10a of this reference example does not have the flow path member 120, so that a major part of the air flowing in through the second grille 12 is guided upward. In the fuel cell vehicle 10a of this reference example, the air flowing in through the first and the second grilles 11 and 12 is thus likely to readily reach the air intake 100, along with raindrops and snow.

A9. Second Reference Example

Figure 9:
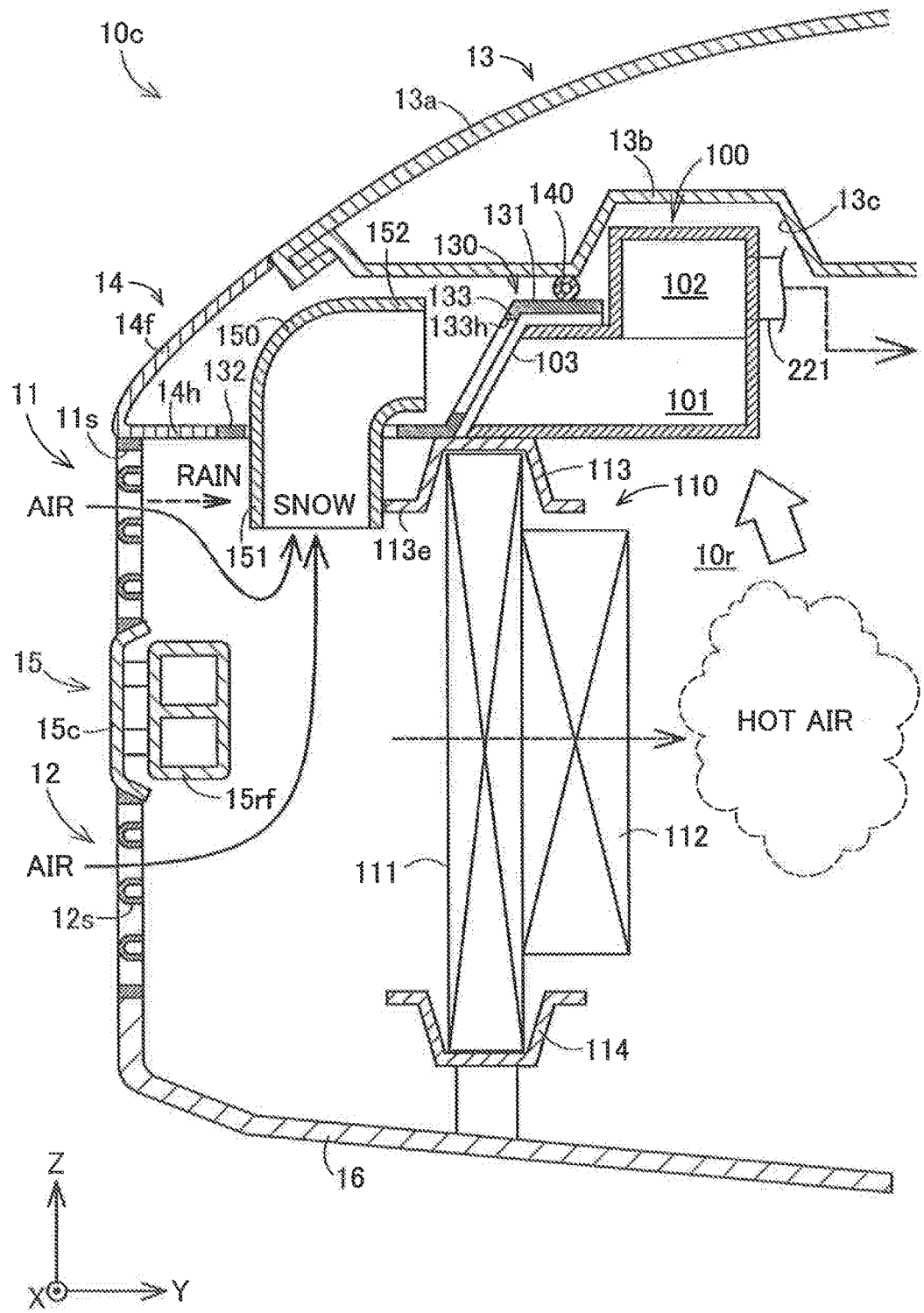
FIG. 9 is a schematic diagram illustrating the flows of the air in a configuration provided with a duct to prevent raindrops from entering a vehicle inner space as a second reference example.

FIG. 9 is a schematic diagram illustrating the flows of the air in a configuration provided with a duct 150 in place of the flow path member 120 to prevent raindrops from entering a vehicle inner space 10r as a second reference example. FIG. 9 illustrates the schematic section of a vehicle inner space 10r in a fuel cell vehicle 10c of the second reference example, like FIG. 8. The fuel cell vehicle 10c of the second reference example has similar configuration to the configuration of the fuel cell vehicle 10a of the first reference example described above, except that the fuel cell vehicle 10c is provided with the duct 150.

The duct 150 includes a first opening end portion 151 that is located on the first grille 11-side and is open downward and a second opening end portion 152 that is open toward the opening 103 of the air intake 100. In the fuel cell vehicle 10c of the second reference example, raindrops sucked through the first grille 11 collide with a side wall portion of the first opening end portion 151 of the duct 150. This suppresses raindrops from being guided to the air intake 100.

Snow is, however, more likely to fly up on the flow of the air compared with raindrops. In the fuel cell vehicle 10c of the second reference example, suction of the air by the air intake 100 is likely to guide the snow into the duct 150. Unlike the flow path member 120 of the embodiment, the duct 150 of this reference example is likely to guide the entire snow flowing in through the first grille 11 to the vehicle inner space 10r, into the duct 150.

Additionally, the duct 150 of this reference example is likely to suck water flowing in through the first grille 11 or the second grille 12 to below the duct 150 in the case where the fuel cell vehicle 10 enters a water channel of high water depth or a water-covered road. The duct 150 of the reference example also reduces the power of the driving wind flowing in through the first grille 11. This increases the likelihood that the hot air heated with waste heat is mixed with the air guided into the opening 103 of the air intake 100 and thereby increases the likelihood that the cathode gas supplied to the fuel cell 21 has a temperature rise.

Compared with the configurations of these reference examples, in the fuel cell vehicle 10 of the embodiment, as described above, the flow path member 120 guides the air flowing in through the first grille 11, to the air intake 100, while separating raindrops and snow included in the air. This configuration ensures the volume of the outside air flowing into the air intake 100, while suppressing raindrops and snow from entering the air intake 100. In the fuel cell vehicle 10 of the embodiment, the flow path member 120 also suppresses a temperature rise of the cathode gas by the hot air heated with waste heat or the like in the vehicle inner space 10r and thereby suppresses a significant increase in operating temperature of the fuel cell 21. Additionally, in the fuel cell vehicle 10 of the embodiment, the flow path member 120 and the inner cover member 130 suppress the water flowing in through the first grille 11 in the case where the fuel cell vehicle 10 is flooded or exposed to water from flowing into the air intake 100.

B. Second Embodiment

Figure 10:
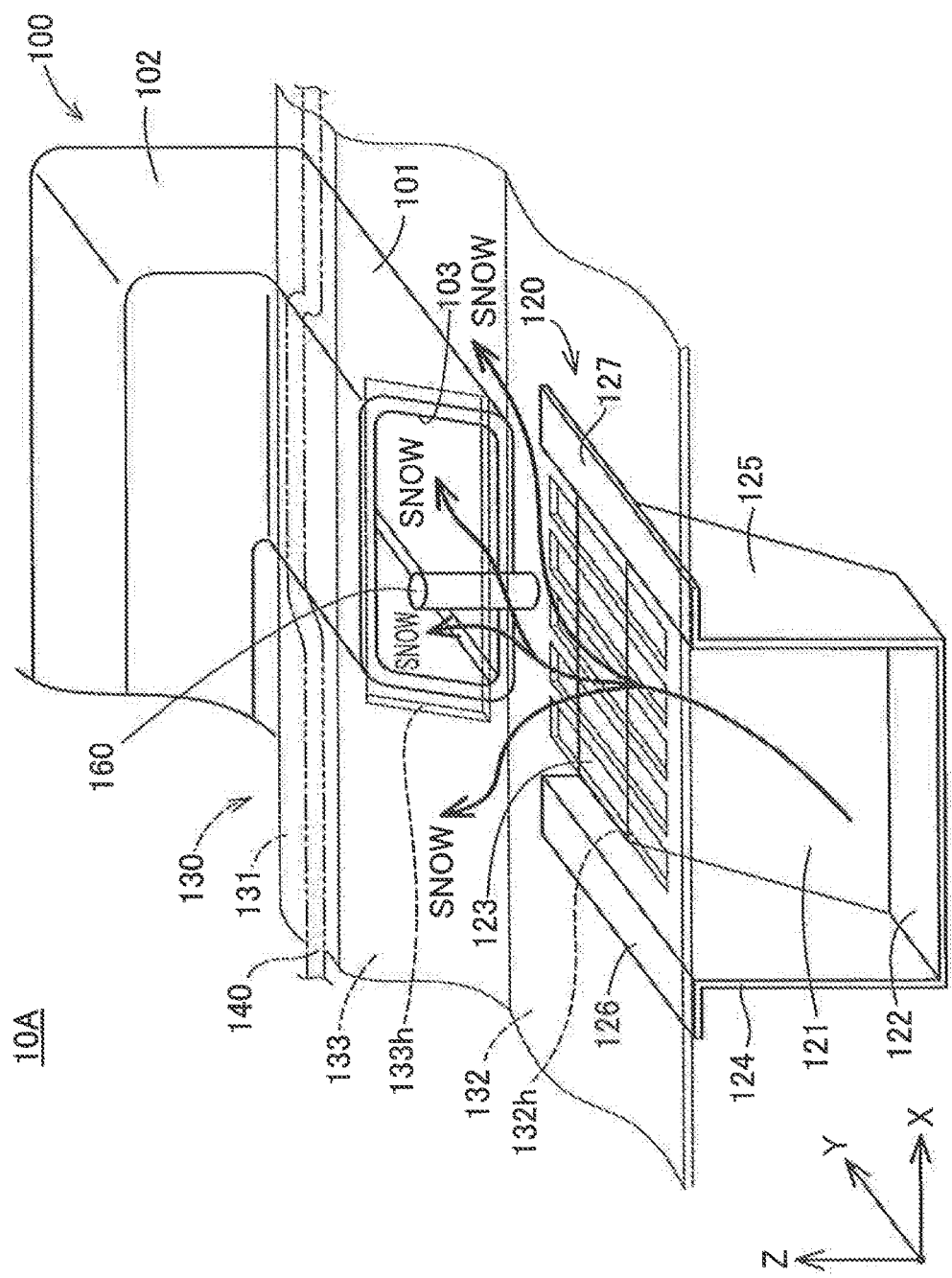
FIG. 10 is a schematic perspective view illustrating the configuration in the vicinity of an opening of an air intake in a fuel cell vehicle according to a second embodiment.

FIG. 10 is a schematic perspective view illustrating the configuration in the vicinity of an opening 103 of an air intake 100 in a fuel cell vehicle 10A according to a second embodiment of the invention. The fuel cell vehicle 10A has substantially similar configuration to the configuration of the fuel cell vehicle 10 of the first embodiment, except that a protrusion 160 is provided in front of the opening 103 of the air intake 100. The protrusion 160 is an approximately columnar projection that is formed to be extended upward on the upper surface of the second horizontal wall portion 132 of the inner cover member 130. The protrusion 160 is placed on an approximate center in the vehicle width direction of the opening 103 of the air intake 100. When the upper cover member 13 shown in FIG. 2 is closed, an end of the protrusion 160 comes into contact with the inner wall portion 13b of the upper cover member 13 and serves as a stopper relative to the upper cover member 13.

Part of the snow passing through the through holes 132h of the inner cover member 130 collides with the protrusion 160 and is adsorbed thereon. The flow of the air flowing into the opening 103 of the air intake 100 is divided into two flows in the lateral direction by the protrusion 160. Part of the snow passing through the through holes 132h of the inner cover member 130 is accordingly guided to the outside of the air intake 100 and to the inner wall surface on the side of the lower flow path portion 101 by the inertial force applied by the protrusion 160 in the air guiding direction to adhere to the wall surface of the inner cover member 130 and the inner wall surface of the air intake 100. This configuration suppresses the snow included in the air from reaching deep inside of the air intake 100 and thereby reaching the air cleaner 223 on the downstream side shown in FIG. 1. The protrusion 160 may be formed in a streamline sectional shape, in order to form the smoother air flow. A plurality of protrusions 160 may be provided. The protrusion 160 may be placed in front of the opening 103 along the vehicle width direction in order to divide the air flow into two flows in the vertical direction.

C. Third Embodiment

Figure 11:
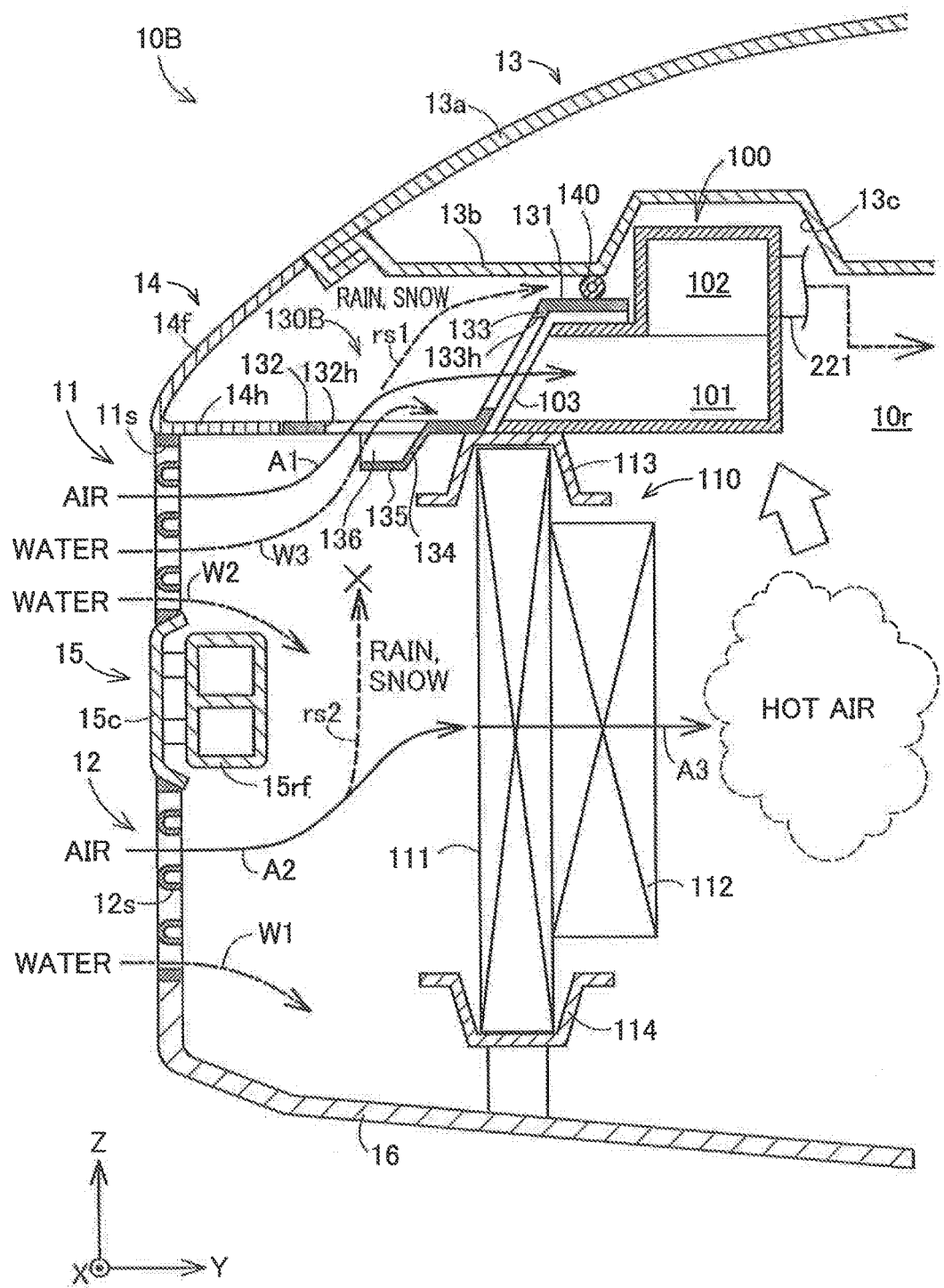
FIG. 11 is a schematic sectional view illustrating the configuration of a vehicle inner space in a fuel cell vehicle according to a third embodiment.

FIG. 11 is a schematic sectional view illustrating the internal configuration of a vehicle inner space 10r in a fuel cell vehicle 10B according to a fourth embodiment of the invention. FIG. 11 illustrates the schematic section of the fuel cell vehicle 10B, like FIG. 2. The fuel cell vehicle 10B of the third embodiment has substantially similar configuration to the configuration of the fuel cell vehicle 10 of the first embodiment, except the fuel cell vehicle 10B does not have the flow path member 120 and has an inner cover member 130B of a different configuration.

In the fuel cell vehicle 10B of the third embodiment, first to third guide wall portions 134 to 136 for guiding the air are provided below the through holes 132h of the inner cover member 130B. The first guide wall portion 134 is an inclined wall portion that is inclined downward from rear edges of the respective through holes 132h toward the front. The second guide wall portion 135 is a wall portion extended horizontally forward from a lower end of the first guide wall portion 134. The third guide wall portions 136 are side wall portions provided in the through holes 132h located on the respective ends in the vehicle width direction among the plurality of through holes 132*h*. The third guide wall portions 136 are formed between the outer edges in the vehicle width direction of the through holes 132*h* and the outer edges in the vehicle width direction of the first and the second guide wall portions 134 and 135.

In the fuel cell vehicle 10B of the third embodiment, the respective guide wall portions 134 to 136 of the inner cover member 130B serve like the flow path member 120 described in the first embodiment. For example, the first and the second guide wall portions 134 and 135 guide the air flowing in through the first grille 11, to the opening 103 of the air intake 100, while separately guiding raindrops and snow flowing in along with the air, upward above the opening 103 of the air intake 100. The third guide wall portions 136 effectively guides the driving wind flowing in through the first grille 11, to the opening 103 of the air intake 100. Additionally, the respective guide wall portions 134 to 136 serve to suppress snow from flowing upward or sideward into the through holes 132*h*.

D. Fourth Embodiment

Figure 12:
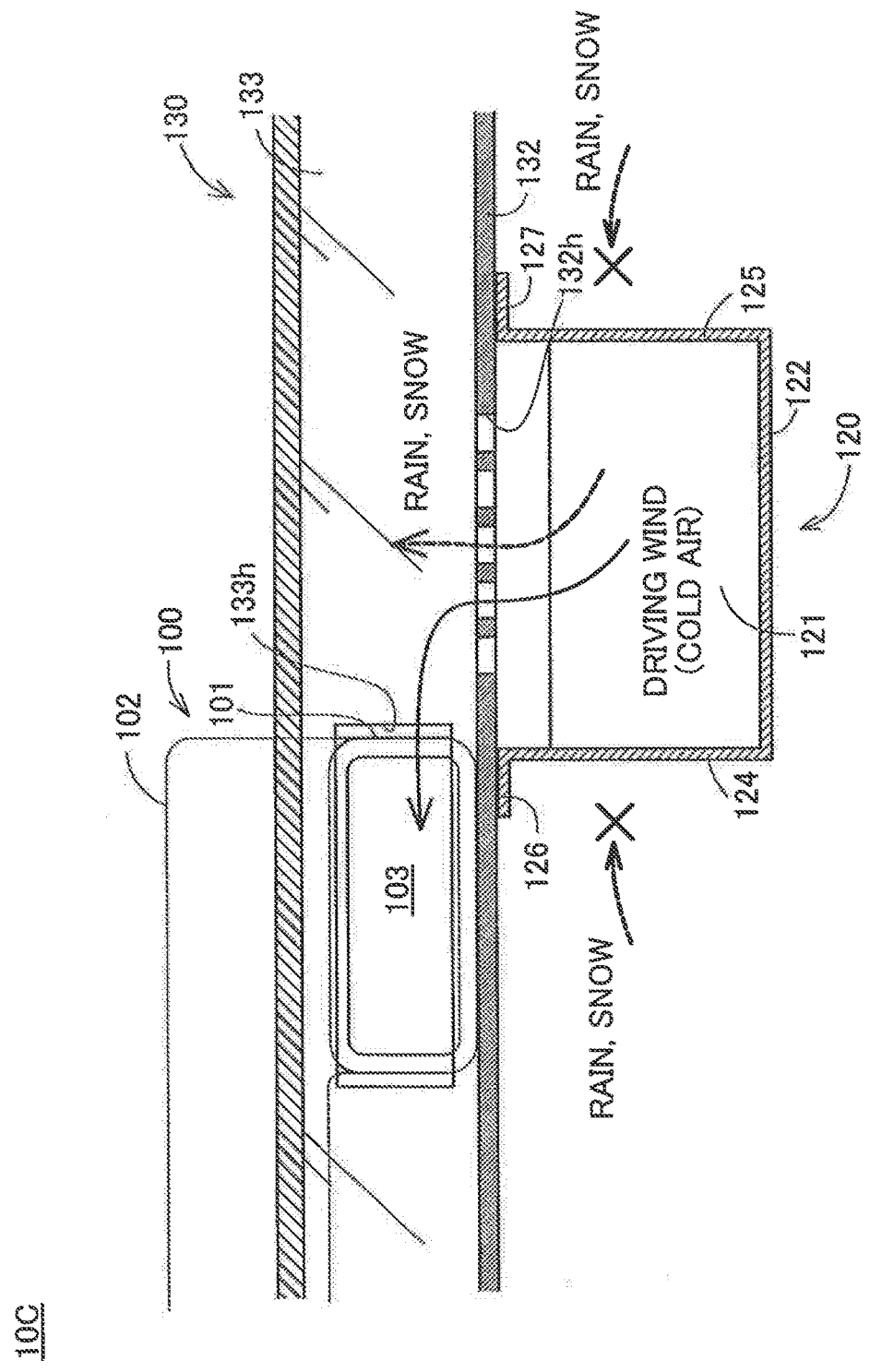
FIG. 12 is a schematic diagram illustrating an intake structure in a fuel cell vehicle according to a fourth embodiment.

FIG. 12 is a schematic diagram illustrating an intake structure in a fuel cell vehicle 10C according to a fourth embodiment. FIG. 12 schematically illustrates the air intake 100, the flow path member 120, the inner cover member 130 and the seal member 140, viewed along the vehicle longitudinal direction. In the fuel cell vehicle 10C of the fourth embodiment, the opening 103 of the air intake 100 is deviated from and is not aligned with the mounting position of the flow path member 120 in the vehicle width direction. This configuration further suppresses raindrops and snow from flowing into the air intake 100.

E. Modifications

E1. Modification 1

In the respective embodiments described above, the fuel cell vehicle 10 or 10A is equipped with the polymer electrolyte fuel cell as the fuel cell 21. According to a modification, the fuel cell vehicle 10 or 10A may be equipped with any of various types of fuel cells other than the polymer electrolyte fuel cell. The fuel cell 21 mounted on the fuel cell vehicle 10 or 10A may be, for example, a solid oxide fuel cell. The fuel cell mounted on the fuel cell vehicle 10 or 10A may be any type of fuel cell that is configured to generate electric power using the air taken in from the outside.

E2. Modification 2

In the respective embodiments described above, the vehicle inner space 10*r* which the air is taken in through the first and the second grilles 11 and 12 is provided in the forward portion of the fuel cell vehicle 10 or 10A. According to a modification, the vehicle inner space 10*r* which the air is taken in through the first and the second grilles 11 and 12 may be provided in a region other than the forward portion of the fuel cell vehicle 10 or 10A. For example, the vehicle inner space 10*r* may be provided in a middle upper portion of the fuel cell vehicle 10 or 10A. The vehicle inner space 10*r* which the air is taken in through the first and the second grilles 11 and 12 may be provided in any location that takes in the air from the front.

E3. Modification 3

In the first embodiment, the second embodiment and the fourth embodiment described above, the flow path member 120 is configured to have the first and the second horizontal wall portions 122 and 123, the first and the second side wall portions 124 and 125 and the first and the second fixing wall portions 126 and 127, in addition to the inclined wall portion 121. In the third embodiment described above, the inner cover member 130B is configured to have the first to the third guide wall portions 134 to 135. According to a modification, the flow path member 120 may be configured to have only the inclined wall portion 121, or the inner cover member 130B may be configured to have only the first guide wall portion 134 as the inclined wall portion. The inclined wall portion 121 or the first guide wall portion 134 may not be formed from a flat plate member but may be formed from, for example, a curved plate member. The inclined wall portion 121 or the first guide wall portion 134 may not be formed from a plate member but may be formed from a member having a surface that forms an inclined surface, such as a triangular prism member.

E4. Modification 4

In the first embodiment, the second embodiment and the fourth embodiment described above, the inner cover member 130 may be omitted from the fuel cell vehicle 10, 10A or 10C. In the fuel cell vehicle 10, 10A or 10C, in place of the inner cover member 130, a flat plate member having through holes may be provided above the flow path member 120. In the respective embodiments described above, the through hole 132*h* of the inner cover member 130 or 130B may not be configured as a plurality of parallel through grooves but may be configured as a single through hole.

E5. Modification 5

In the respective embodiments described above, the fuel cell vehicle 10 is provided with the radiator unit 110 using the air taken in from the outside as the heat medium to be placed along with the air intake 100 in the same vehicle inner space 10*r*. According to a modification, the radiator unit 110 may be placed in a different vehicle inner space that is separated from the vehicle inner space 10*r* which the air intake 100 is placed in. A different auxiliary machine other than the radiator unit 110 may be placed behind the second grille 12 in the vehicle inner space 10*r*. The second grille 12 may be omitted from the vehicle inner space 10*r*.

E6. Modification 6

In the first embodiment, the second embodiment and the fourth embodiment described above, the flow path member 120 is arranged such that a certain cavity is formed between the flow path member 120 and the first grille 11. According to a modification, the flow path member 120 may be arranged close to the first grille 11.

E7. Modification 7

In the respective embodiments described above, the air intake 100 is arranged to be open forward. According to a modification, the air intake 100 may be arranged to be open in a direction other than the forward direction. For example, the air intake 100 may be arranged to be open in a direction intersecting with the vehicle longitudinal direction.

E8. Modification 8

In the respective embodiments described above, the seal member 140 is arranged to be locally placed backward in the region above the lower flow path portion 101 of the air intake 100. According to a modification, the seal member 140 may be arranged to be placed at the same position in the vehicle longitudinal direction in the region above the lower flow path portion 101 of the air intake 100 as that in the remaining region.

E9. Modification 9

In the respective embodiments described above, the intake structure including the first and the second grilles 11 and 12, the air intake 100 and the flow path member 120 is provided in the vehicle inner space 10r of each of the fuel cell vehicles 10 and 10A to 10C. According to a modification, an intake structure similar to each of the embodiments and the modifications may be provided in an inner space of a moving body other than the fuel cell vehicle equipped with a fuel cell. For example, an intake structure similar to each of the embodiments and the modifications may be provided in an inner space of an aircraft or a ship equipped with a fuel cell.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 10, 10A-10C fuel cell vehicle
10r vehicle inner space
11, 12 first and second grilles
11s, 12s openings
13 upper cover member
13a outer wall portion
13b inner wall portion
14 front cover member
14f inclined wall portion
14h horizontal wall portion
15 bumper structure
15c outer cover portion
15rf reinforcing beam portion
16 lower cover member
100 air intake
101 lower flow path portion
102 upper flow path portion
103 opening
110 radiator unit
111 radiator main body
112 fan part
113, 114 holding member
113e fringe portion
120 flow path member
121 inclined wall portion
122, 123 first and second horizontal wall portions
124, 125 first and second side wall portions
126, 127 first and second fixing wall portions
130, 130B inner cover member
131, 132 first and second horizontal wall portions
132h through holes
133 inclined wall portion
133h through hole
134-136 guide wall portions
140 seal member
150 duct
160 protrusion
150 fuel cell system
21 fuel cell
22 cathode gas supply system
221 supply pipe
223 air cleaner
224 air compressor
225 on-off valve
23 cooling medium circulation/supply system
231 cooling medium supply pipe
232 cooling medium discharge pipe
233 circulation pump

The invention claimed is:

1. A moving body equipped with a fuel cell, the moving body comprising:
 a first grille that is provided with a first air inlet, the first inlet being configured to be open forward of the moving body and take in the air outside of the moving body;
 an inlet duct member that is placed in a location behind and above the first air inlet and is configured to take in the air as a reactive gas that is to be supplied to the fuel cell;
 a flow path member that is configured to guide the air, the flow path member being placed in a location behind the first air inlet and in front of and below the inlet duct member, the flow path member having an inclined wall portion, the inclined wall portion is located away from the first grille and is arranged to face the first air inlet and is inclined obliquely upward from front to rear;
 a second grille that is provided with a second air inlet, the second air inlet being placed in a location below the first air inlet and being configured to be open in a location below the flow path member and take in the air from outside of the moving body; and
 a heat exchanger that is placed behind the second air inlet and is configured to exchange heat with the air.

2. The moving body according to claim 1,
 wherein the flow path member has first and second side wall portions that are provided on both sides of the inclined wall portion in a width direction of the moving body and are extended from the inclined wall portion toward the first air inlet, and
 a distance in the width direction of the moving body between end sides of the first and the second side wall portions facing the first air inlet is smaller than an opening width of the first air inlet in the width direction of the moving body.

3. The moving body according to claim 1,
 wherein a cavity is formed between the first grille and the inclined wall portion of the flow path member to be open downward of the moving body.

4. The moving body according to claim 1, further comprising
 an opening wall member having a wall surface that is arranged to face an inclined surface of the inclined wall portion at a position above the inclined wall portion of the flow path member and in front of the inlet duct member and is extended in the width direction of the moving body, and at least one through hole that is formed in the wall surface to be open toward the inclined surface of the inclined wall portion.

5. The moving body according to claim 1, wherein the inlet duct member has a flow path portion that is extended forward of the moving body and is configured to be open forward of the moving body.

6. The moving body according to claim 5, further comprising:
an upper cover member that is arranged to cover at least an area from the first air inlet to a rear end of the inlet duct member and forms an upper surface of the moving body; and
a seal member that is extended in a direction intersecting with an extending direction of the flow path portion above the flow path portion of the inlet duct member and is pressed against the upper cover member to form a seal line that seals a region behind the flow path portion, wherein
the seal member is arranged to be locally placed backward of the moving body in a location above the flow path portion.

7. A moving body equipped with a fuel cell, the moving body comprising:
a first air inlet that is configured to be open forward of the moving body and take in the air outside of the moving body;
an inlet duct member that is placed in a location behind and above the first air inlet and is configured to take in the air as a reactive gas that is to be supplied to the fuel cell;
a flow path member that is configured to guide the air, the flow path member being placed in a location behind the first air inlet and in front of and below the inlet duct member, the flow path member having an inclined wall portion that is arranged to face the first air inlet and is inclined obliquely upward from front to rear;
a second air inlet that is placed in a location below the first air inlet and is configured to be open in a location below the flow path member and take in the air from outside of the moving body; and
a heat exchanger that is placed behind the second air inlet and is configured to exchange heat with the air, wherein
a cavity is formed between the first air inlet and the inclined wall portion of the flow path member to be open downward of the moving body,
the flow path member has first and second side wall portions that are provided on both sides of the inclined wall portion in a width direction of the moving body and are extended from the inclined wall portion toward the first air inlet,
a distance in the width direction of the moving body between end sides of the first and the second side wall portions facing the first air inlet is smaller than an opening width of the first air inlet in the width direction of the moving body, and
the first and second side wall portions are respectively located below one of both sides of an inlet opening of the inlet duct member viewed along a longitudinal direction of the moving body.

8. A moving body equipped with a fuel cell, the moving body comprising:
a first air inlet that is configured to be open forward of the moving body and take in the air outside of the moving body;
an inlet duct member that is placed in a location behind and above the first air inlet and is configured to take in the air as a reactive gas that is to be supplied to the fuel cell;
a flow path member that is configured to guide the air, the flow path member being placed in a location behind the first air inlet and in front of and below the inlet duct member, the flow path member having an inclined wall portion that is arranged to face the first air inlet and is inclined obliquely upward from front to rear;
a second air inlet that is placed in a location below the first air inlet and is configured to be open in a location below the flow path member and take in the air from outside of the moving body;
a heat exchanger that is placed behind the second air inlet and is configured to exchange heat with the air; and
an opening wall member having a wall surface that is arranged to face an inclined surface of the inclined wall portion at a position above the inclined wall portion of the flow path member and in front of the inlet duct member and is extended in the width direction of the moving body, and at least one through hole that is formed in the wall surface to be open toward the inclined surface of the inclined wall portion, wherein
the flow path member has first and second side wall portions that are provided on both sides of the inclined wall portion in a width direction of the moving body and are extended from the inclined wall portion toward the first air inlet,
a distance in the width direction of the moving body between end sides of the first and the second side wall portions facing the first air inlet is smaller than an opening width of the first air inlet in the width direction of the moving body, and
the first and second side wall portions are fixed at a wall surface of the opening wall member.

* * * * *